US008214348B2

(12) United States Patent
Liu et al.

(10) Patent No.: US 8,214,348 B2
(45) Date of Patent: Jul. 3, 2012

(54) SYSTEMS AND METHODS FOR FINDING KEYWORD RELATIONSHIPS USING WISDOMS FROM MULTIPLE SOURCES

(75) Inventors: Weiguo Liu, Dublin, CA (US); Qiong Zhang, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 268 days.

(21) Appl. No.: 12/712,800

(22) Filed: Feb. 25, 2010

(65) Prior Publication Data

US 2011/0208708 A1    Aug. 25, 2011

(51) Int. Cl.
G06F 17/30    (2006.01)
(52) U.S. Cl. .................. 707/706; 707/721; 707/725
(58) Field of Classification Search ............. 707/706, 707/721, 725; 705/14.4, 14.49, 14.47; 345/160, 345/161, 162, 163
See application file for complete search history.

(56) References Cited

U.S. PATENT DOCUMENTS

| 6,772,150 B1 | 8/2004 | Whitman et al. | |
| 7,849,080 B2 * | 12/2010 | Chang et al. | 707/723 |
| 2008/0243826 A1 * | 10/2008 | Bartz et al. | 707/5 |
| 2009/0182734 A1 * | 7/2009 | Wen et al. | 707/5 |
| 2010/0094673 A1 * | 4/2010 | Lobo et al. | 705/7 |
| 2011/0010263 A1 * | 1/2011 | Skinner | 705/26.3 |
| 2011/0213655 A1 * | 9/2011 | Henkin et al. | 705/14.49 |

OTHER PUBLICATIONS

Co-Pending U.S. Appl. No. 12/396,163, filed Mar. 2, 2009.
Co-pending U.S. Appl. No. 12/419,923, filed Mar. 4, 2009.
Juan Ramos, "Using TF-IDF to Determine Word Relevance in Document Queries"; Department of Computer Science, Rutgers University, Piscataway, New Jersey; 4 pgs; undated.
Ariel Fuxman et al., "Using the Wisdom of the Crowds for Keyword Generation"; WWW 2008, Apr. 21-25, 2008; Beijing, China; pp. 61-70.
Juan Ramos, "Using TF-IDF to Determine Word Relevance in Document Queries"; Department of Computer Science, Rutgers University, Piscataway, New Jersey; 4 pp.; Published Dec. 2003 (ICML 2003).
R. Baeza-Yates et al., "Query Recommendation Using Query Logs in Search Engines"; Center for Web Research, Department of Computer Science, Universidad de Chile; 10 pp.; Published 2004 (EDBT).

* cited by examiner

*Primary Examiner* — Cheryl Lewis
(74) *Attorney, Agent, or Firm* — Brinks Hofer Gilson & Lione

(57) ABSTRACT

Systems and methods for finding related terms based on three different sources are disclosed. Generally, a first plurality of distances is determined based on one or more received terms and a first plurality of terms derived from an algorithmic search list. A second plurality of distances is determined based on the one or more received terms and a second plurality of terms derived from a sponsored search list. A third plurality of distances is determined based on the one or more received terms and a third plurality of terms derived from search logs. The first, second, and third pluralities of distances are combined to derive a fourth plurality of distances. Finally, a plurality of related terms related to the one or more received terms is generated based on the fourth plurality of distances.

29 Claims, 4 Drawing Sheets

SYSTEMS AND METHODS FOR FINDING KEYWORD RELATIONSHIPS USING WISDOMS FROM MULTIPLE SOURCES

BACKGROUND

Many search engine applications utilize relationships between keywords. These applications include keyword recommendation, context search recommendation, and the keyword broad match in sponsored search. The present disclosure is directed to keyword recommendation. More specifically, the present disclosure is directed to systems and methods for finding keywords using wisdoms from multiple sources. These systems and methods provided a foundation for other applications that use keyword relationship.

When advertising using an online advertisement service provider such as Yahoo! Search Marketing™, users often wish to identify appropriate keywords so that the advertisement could be viewed and clicked on by any potential customers. Finding the right keywords for an advertiser enables the search engine to provide the advertisers an efficient way to reach out to customers all over the world with an affordable cost.

Various systems and methods for finding keywords are disclosed in U.S. patent application Ser. No. 11/432,266, U.S. Pat. No. 7,548,929 and Ser. No. 11/432,585, filed May 11, 2006 and assigned to Yahoo! Inc. For example, in some implementations in accordance with U.S. patent application Ser. No. 11/432,266, U.S. Pat. No. 7,548,929 and Ser. No. 11/432,585, a keyword suggestion component may look at actual searches conducted in the last month and provide a suggestion based on previous searches. In other implementations in accordance with U.S. patent application Ser. No. 11/432,266, U.S. Pat. No. 7,548,929 and Ser. No. 11/432,585, a keyword suggestion component may look at the terms other advertisers of similar products are bidding on and suggest these terms to the advertiser.

It would be desirable to develop additional systems and methods for finding keywords based on other sources of data.

SUMMARY

Keyword or search phrase recommendation is one key system for use with a search engine and for use by sponsored search bidders. For a search engine, it can be used for search recommendation. After a user provides a search phrase (also known as a search query), the search engine can recommend various phrases that are related to the search phrase and may well be more closely related to the actual intent of the user. For an advertiser, it is important to identify search phrases that provide for a successful advertisement campaign. For example, whether a campaign is successful often depends on whether the campaign generates certain levels of traffic or click through volume, quality traffic, relevant clicks, and acceptable conversion rates. The present disclosure provides systems and methods for keyword recommendation under a framework that combines multiple machine learning methods from multiple data sources.

One implementation discloses a computer implemented method or program for determining related terms or to find appropriate keywords. The computer implemented method comprises the following steps. First, the program receives one or more terms. Second, the program determines, in a cloud computing environment, a first plurality of distances based on the one or more received terms and a first plurality of terms that is derived from an algorithmic search list, wherein a search engine server generates the first plurality of terms based on the one or more received terms. Third, the program determines, in the cloud computing environment, a second plurality of distances based on the one or more received terms and a second plurality of terms that is derived from a sponsored search list, wherein the second plurality of terms is generated based on the one or more received terms. Fourth, the program determines, in the cloud computing environment, a third plurality of distances based on the one or more received terms and a third plurality of terms, wherein the third plurality of terms is derived from one or more search logs. Fifth, the program combines the first, second, and third pluralities of distances to derive a fourth plurality of distances. Finally, the program generates a plurality of related terms related to the one or more received terms based on the fourth plurality of distances.

Another implementation discloses a computer system for generating related terms based on one or more terms, the computer system comprising the following modules. A first module is configured to receive one or more terms. A second module is configured to determine a first plurality of distances based on the one or more received terms and a first plurality of terms that is derived from an algorithmic search list generated by a search engine server based on the one or more received terms. A third module is configured to determine a second plurality of distances based on the one or more received terms and a second plurality of terms that is derived from a sponsored search list generated based on the one or more received terms. A fourth module is configured to determine a third plurality of distances based on the one or more received terms and a third plurality of terms that is derived from search logs. Search logs comprise a large number of search sessions. Each search session includes all the search queries and search clicks logged during this period from a single user. A fifth module is configured to combine the first, second, and third pluralities of distances to derive a fourth plurality of distances. A sixth module is configured to generate a plurality of related terms related to the one or more received terms based on the fourth plurality of distances.

DETAILED DESCRIPTION OF THE DRAWINGS

The present disclosure is directed to systems and methods for finding keyword relationships using wisdoms from multiple sources. An online advertisement service provider ("ad provider") may desire to find related terms to suggest new terms to online advertisers so that the advertisers can better focus or expand delivery of advertisements to potential customers. Similarly, a search engine may desire to determine related terms to assist a searcher performing research at the search engine. Providing a searcher with related terms allows the searcher to broaden or focus a search so that search engines provide more relevant search results to the searcher. The related terms may comprise at least one of text, voice, image, and video.

Figure 1:
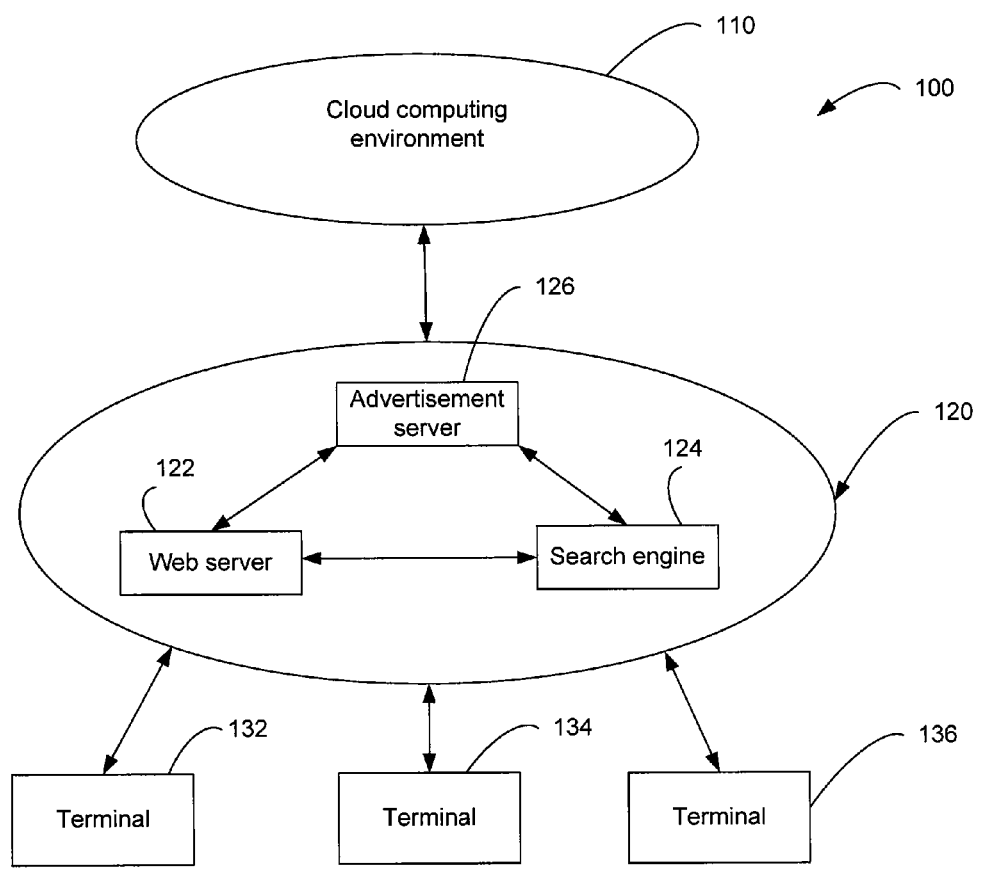
FIG. 1 is a block diagram of one embodiment of an environment in which a system for finding keywords may operate.

FIG. 1 is a block diagram of one embodiment of an environment in which a system for determining related terms may operate. However, it should be appreciated that the systems and methods described below are not limited to use with a search engine or pay-for-placement online advertising.

The environment 100 may include a cloud computing environment 110 and a connected server system 120 including a web server 122, a search engine 124, and an advertisement server 126. The web server 122 may be a computer, a server, or any other computing device known in the art, or the web server 122 may be a computer program, instructions, and/or software code stored on a computer-readable storage medium that runs on a processor of a single server, a plurality of servers, or any other type of computing device known in the art. The web server 122 delivers content, such as a web page, using the Hypertext Transfer Protocol. The web server 122 may also be a virtual machine running a program that delivers content. The search engine 124 may be a computer system, one or more servers, or any other computing device known in the art, or the search engine 124 may be a computer program, instructions, and/or software code stored on a computer-readable storage medium that runs on a processor of a single server, a plurality of servers, or any other type of computing device known in the art. The search engine 124 is designed to help users find information located on the Internet or an intranet. The advertisement server 126 may be a computer system, one or more servers, or any other computing device known in the art, or the advertisement server 126 may be a computer program, instructions and/or software code stored on a computer-readable storage medium that runs on a processor of a single server, a plurality of servers, or any other type of computing device known in the art. The advertisement server 126 is designed to provide digital ads to a web user based on display conditions requested by the advertiser.

The environment 100 may further include a plurality of terminals 132, 134, and 136. The terminals may be a computer, a smart phone, a personal digital aid, a Global Positioning System (GPS) receiver, or any other terminal that may be used to access the Internet.

Generally, an advertiser or any other user can use a terminal to access information on the server system 120. For example, the advertiser may purchase digital ads based on an auction model of buying ad space or a guaranteed delivery model by which an advertiser pays a minimum cost-per-thousand impressions (i.e., CPM) to display the digital ad. Typically, advertisers may want to find a set of keywords that attracts the most potential customers to their websites. To achieve this goal, advertisers normally want to identify keywords that are closely related to their advertising campaign. However, advertisers may not initially have a clearly defined advertising campaign and may not have initially identified the exact terms or keywords to associate with their advertising campaign. For example, the advertisers may want to sell shoes to teenage boys. The advertisers may have several terms such as "shoes," "sneakers," or "sports shoes" in mind for their advertisement campaign, but the advertiser would like to identify keywords related to "shoes," "sneaker," or "sports shoes" that may attract teenage boys or their parents to click on an advertisement after searching for any of those keywords. One goal of the disclosed methods is to provide tools for advertisers to identify additional keywords for their advertisement campaign to attract more potential customers. By utilizing appropriate keywords, it would be possible for any potential customer all over the world to visit a website promoted by the advertisers.

For example, when an Internet user utilizes one of the terminals 132, 134, 136 to submit a search query to the search engine 124, the search engine 124 may return a plurality of search listings to the Internet user. The advertisement server 126 may additionally serve one or more digital ads to the Internet user based on search terms provided by the Internet user. In addition or alternatively, when an Internet user utilizes one of the terminals 132, 134, 136 to view a website served by the web server 122, the advertisement server 126 may serve one or more digital ads to the Internet user based on keywords obtained from the content of the website.

From an external point of view, the entire search engine 124 can be represented as a two-layer network. The top layer may include all search keywords. Keywords may represent canonical or search engine standardized search phrase. In other words, each keyword represents a search engine results page (SERP). The second layer may include all search listings. The search listings may include two sets of lists: the algorithmic search lists and the sponsored search lists. Each listing may include listing text comprising a heading, a URL, and a short description. Each keyword or listing is a node in the two-layer network. The keywords and listings may be constructed as nodes in a graph where there are arcs that connect pairs of nodes. For example, there is a natural arc from a keyword to a listing if the listing is present in the SERP of the keywords. The distance for the arc can be proportional to the position of listing in the SERP. For example, the listing in the first position in the SERP of a search keyword has a distance of 1 between the listing and the search keyword. In some implementations, only arcs measuring distances in a first SERP or a first and a second SERP may be used, or distances that are no greater than a predefined threshold may be used. The words in listings on the first one or two SERPs may form word bags. With these word bags, we can define distances between keywords. Here, a word bag is a model representation of documents, in which each document is represented as a vector of weighted terms, and the cosine distance between two vectors is used as a similarity measurement.

An arc may exist between two keywords. For each arc between two keywords, a distance may be defined using multiple sources. For example, wisdoms may be used from sources such as a search engine and its page ranking algorithm, an advertiser and the listings that the advertiser created, and search users and the search patterns and click-through of the search users. Once the distances from multiple sources are determined, the distances may be combined in various ways for different applications.

Figure 2:
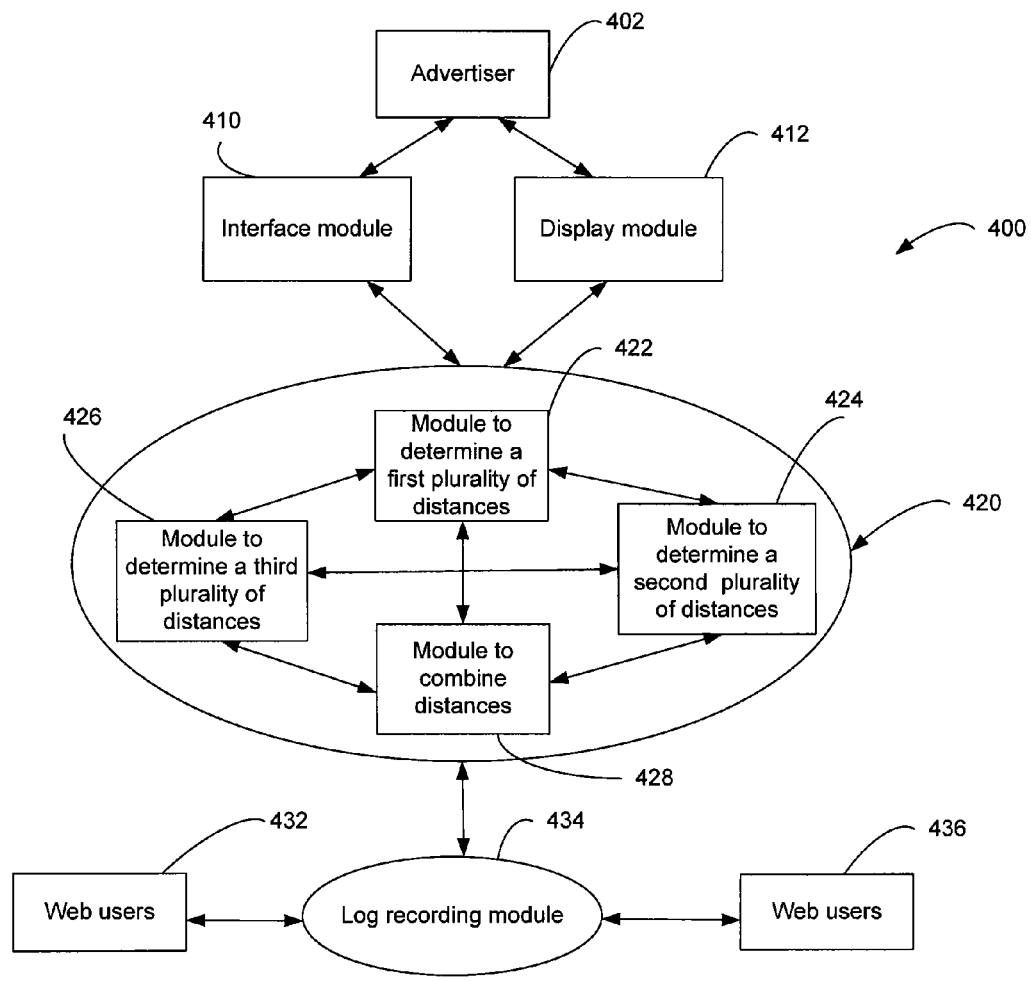
FIG. 2 is a block diagram of a system for identifying keywords for advertisers using wisdom from multiple sources.

FIG. 2 is a block diagram of a system 400 for identifying keywords for advertisers using wisdom from multiple sources. In one implementation, the multiple sources include algorithmic search lists, sponsored search lists, and user search logs. The algorithm search list may represent the wisdom from web pages and other online sources. The sponsored search lists may represent the wisdom from advertisers. The search logs may represent the wisdom from web users.

Generally, the system includes an interface module 410, a distance calculation module 420, a display module 412, and a log recording module 434. The interface module 410 interacts with advertisers 402 to receive one or more terms. The one or more received terms may include seed terms and source terms. The one or more received terms may be received from a user terminal or from a data file. These terms may be used as seed keyword or source keyword. The distance calculation module 420 determines the distances from multiple sources and combines the distances. The log recording module records web user activities and provide the recorded search log to the distance calculation module 420.

The distance calculation module 420 further comprises four modules: 422, 424, 426, and 428. The module 422 is configured to determine a first plurality of distances based on the one or more received terms and a first plurality of terms that is derived from an algorithmic search list generated by a search engine server based on the one or more received terms. The module 424 is configured to determine a second plurality of distances based on the one or more received terms and a second plurality of terms that is derived from a sponsored search list generated based on the one or more received terms. The module 426 is configured to determine a third plurality of distances based on the one or more received terms and a third plurality of terms that is derived from search logs. Search logs comprise a large number of search sessions. The search logs may be associated with a user terminal or a plurality of user terminals during a certain time period. The length of the time period may be one week, several weeks, or one month. Each search session may include all the search queries and search clicks logged from a single user during the search session. The search log may further include Uniform Resource Locators (URLs) from all the search queries and search clicks. The module 428 is configured to combine the first, second, and third pluralities of distances to derive a fourth plurality of distances.

With the combined distance, the display module 412 may create a graph of terms with the arc weighted by the fourth plurality of distances. Using the created graph, the display module 412 may then generate a plurality of related terms having the shortest distances from the one or more received terms (such as the seed terms) based on the fourth plurality of distances. Based on the user's request, the display module may further display or recommend the related terms when the corresponding combined distance is less than a predetermined value.

Figure 3:
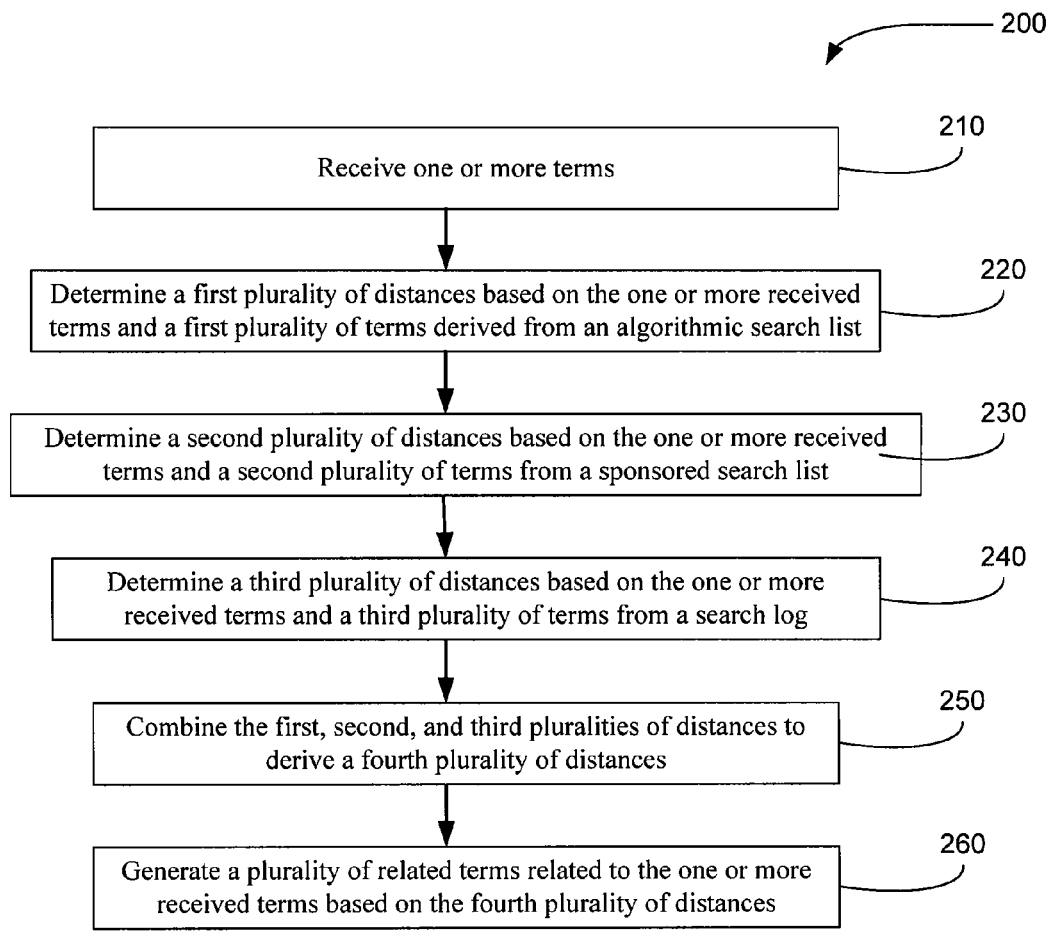
FIG. 3 is a flow chart of one embodiment of a method for determining related terms.

FIG. 3 is a flow chart of one implementation of a method 200 for determining related terms with the computer system 400 in FIG. 2. The method described below assists advertisers in identifying terms that are related to their online advertising campaign. The computer system 400 provides a user interface to interact with the advertisers using a user terminal. In step 210, the user interface in the computer system receives one or more received terms input from the user terminal. For example, the terms may comprise a seed term with a general category such as "shoes" or "toys." The terms may also comprise logical connectors such as "and," "or," and "not." The terms may further comprise a keyword provided by the search engine or a function of keywords. Here, a function may be any customized expression comprising logical connectors or other elements such as "top 10 terms" or "top 20 terms" in a search ranking system. Finally, the computer system may provide a simple instruction menu for the advertisers who prefer an automatic method to choose the related terms. The automatic method may comprise options that provide most searched keywords in a sub category, that provide any related keywords in the most visited web pages, and that provide most widely used keywords by similar advertisers. The automatic method may further comprise time constraints on a time period during which such history data was collected. For example, the time constraints may be a week or a month. Additionally or alternatively, the automatic method may comprise a combination of the above options with other constraints.

After receiving the one or more received terms, the computer system or program uses information from three different sources to determine three different sets of distances. The distance is a measure of a relationship between two terms. For example, for two keywords, the distance may be the frequency that advertisers use the keywords together. In step 220, the search engine server 124 generates a first plurality of terms based on the received one or more received terms. The one or more received terms may be received from a user terminal or from a data file. These terms may be used as seed keyword or source keyword. The first plurality of terms generated by the search engine server 124 forms a word bag. The word bag is a model representation of documents, in which each document is represented as a vector of weighted terms, and the cosine distance between two vectors is used as a similarity measurement. For example, the word bag may consist of words from search listings that are on a first page of search results generated by the search engine server 124. The computer system or program then determines, in a cloud computing environment, a first plurality of distances based on the one or more received terms and the first plurality of terms that is derived from an algorithmic search list. For example, to determine the first plurality of distances, the module 422 in the cloud computing environment weighs the one or more received terms and the first plurality of terms by term frequency inverse document frequency. After that, the module 422 then calculates a plurality of Euclidian distances between the one or more received terms and the first plurality of terms. Alternatively, other measures may be adopted to calculate the distances. For example, the module 422 may apply probabilistic latent semantic indexing (PLSI) to the one or more received terms and a word bag comprising the first plurality of terms. The module 422 then calculates a plurality of Kullback-Leibler (KL) divergences between the one or more received terms and the first plurality of terms in the word bag.

Similarly, at step 230, a second plurality of distances are determined using a second plurality of terms created by the advertisers. The second plurality of terms is generated based on the one or more received terms. In one implementation, the second plurality of terms may be selected from words used in sponsored search listings generated based on the one or more received terms. The second plurality of terms forms a second word bag. For example, the second word bag may consist of words from sponsored search listings that are in a first page of search results. Alternatively, the second plurality of terms may be selected from terms used by other similar advertisers in a particular category based on the advertiser's instruction. With the second plurality of terms, the module 424 determines, in the cloud computing environment, a second plurality of distances based on the one or more received terms and the second plurality of terms. Similar to step 220, the module 424 may adopt Euclidian distances, KL divergence, or other measures in calculating the second plurality of distances between the received one of more terms and the second plurality of terms.

At step 240, a third plurality of distances is determined based on user search logs from search users. Generally, when a search user searches for information using a search engine, the search user provides the search engine with a search phrase (also known as a search query) and performs actions such as clicking on a search listing provided in search results received from the search engine in response to the search phrase. The user activities are often recorded in a search log. For example, the search log may comprise searching and clicking activities in the recent few hours, days, or months depending on the specific application. Generally a search session is a subgroup of a search log that includes all the search queries and search clicks logged during a period from a single user. The search log may further include Uniform Resource Locators (URLs) from all the search queries and search clicks. The search session can be defined in multiple ways. For example, one case is to use certain-time-period inactivity as a search session boundary if a longest duration of inactivity in the search session is less than a predetermined threshold. The search session boundaries may also be defined as activities if the total duration of such search activities is less than a predetermined threshold. The inactivity time period and the total duration may also depend on factors such as user terminal type, connection speed, user information, or searching product type. For example, the inactivity time period may be set longer for users using smart phones utilizing a cellular network rather than users using smart phones utilizing Wi-Fi. Once the search session boundaries have been defined, the similarity between any pair of keywords, keyword/URL, URLs in the same search session can be measured by leveraging multiple measures.

In one embodiment, the third plurality of distances may be measured using conditional probabilities. Specifically, there are at least three types of conditional probabilities based on the recorded Uniform Resource Locators (URLs) and words in the same search session. The first type is the probability that a second URL will appear in the same search session given the existence of the first URL in the search session. The second type is the probability that a URL will appear in the same search session given the existence of a word W in the search session. The third type is the probability that a second word W2 will appear in the same search session given the existence of a first word W1 in the search session. These probabilities may be defined as the following. $P(URL2|URL1)=P(URL2, URL1)/P(URL1)$ is the probability that URL2 will appear in the same search session if URL1 exists in that search session. $P(URL1|URL2)$ is the probability that URL1 will appear in the same search session if URL2 exists in that search session. $P(URL|W)=P(URL, W)/P(W)$ is the probability that URL will appear in the same search session if a word W exists in that search session. Similarly, $P(W|URL)$ is defined as the probability that a word denoted by "W" will appear in the same search session if URL exists in that search session. $P(W2|W1)=P(W2, W1)/P(W1)$ is the probability that a word W2 will appear in the same search session if a word W1 exists. Similarly $P(W1|W2)$ is defined as the probability that the word W1 will appear in the same search session if the word W2 exists in that search session.

At step 250, the module 428 combines the three pluralities of distances determined in steps 220, 230, and 240 to create a fourth plurality of distances. The three pluralities of distances may be combined in various ways for different purposes. The distances from the different sources may be combined linearly or combined to a multiplied product. For example, the advertisers may choose to combine the first and second pluralities of distances linearly. The advertisers may then multiply the third plurality of distance with the linearly combined first and second pluralities of distances to determine the fourth plurality of distance. A plurality of weighting factors may be adapted according to the kind of application. For example, when used to expand the keywords associated with an advertisement campaign, it may be beneficial to weigh the second plurality of distances from the advertisers and/or user clicks on sponsored search more than other factors. The advertisers may adjust these weighting factors directly. Additionally or alternatively, the advertisers may let the program to choose appropriate weighting factors.

After the fourth plurality of distances is generated at step 250, the computer implemented method generates a plurality of related terms related to the one or more received terms based on the fourth plurality of distances at step 260. The fourth plurality of distances may be used to create a graph of terms with the arc weighted by the corresponding distances. The computer system or program may further use the graph to infer similar keywords based on some shortest-distance based greedy algorithms in an on-demand basis. Given a seed keywords and a distance threshold, it will generate a set of keywords whose distance to the seed keyword is less than the threshold based on the graph built in the first part. The distance between any pair of keywords, no matter whether they are directly connected or connected through other keywords or URLs, is defined as the total distance of the shortest path from one keyword to another. Thus, a greedy strategy based graph traversal algorithm can be employed to search the keywords within the distance threshold accordingly. Additionally or alternatively, all or part of the above steps may be implemented to work offline or in a mass parallel grid computing environment.

Figure 4:
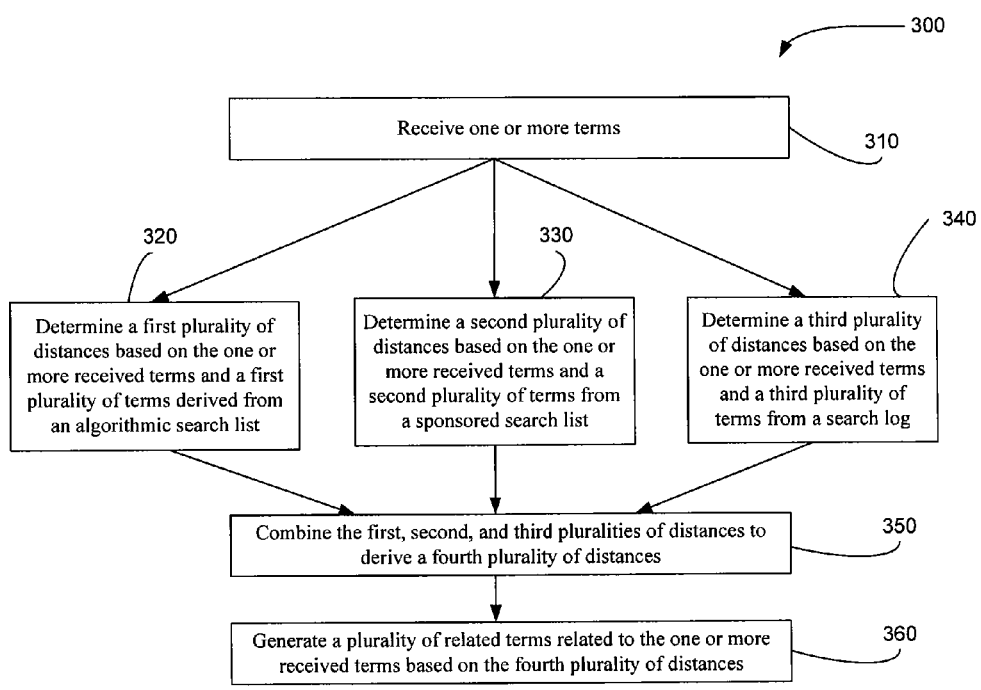
FIG. 4 is a flow chart of another embodiment of a method for determining related terms.

FIG. 4 is a flow chart of another embodiment of a method for determining related terms. The method 300 is different from the method 200 in FIG. 3 in that the steps 320, 330, and 340 are implemented in a parallel manner in FIG. 4. The parallel implementation may improve the efficiency of the computing resources available in the cloud computing environment.

At step 350, the three pluralities of distances generated in steps 320, 330, and 340 are combined to derive a fourth plurality of distances as instructed by the advertiser. The advertiser may weigh the three plurality of distance differently based on his campaign requirement and goal. The distances may be combined linearly. Additionally or alternatively, the distances may be combined using multiplication.

At step 360, the computer implemented method generates a plurality of related terms related to the one or more received terms based on the fourth plurality of distances. As in FIG. 3, all or part of the above steps may be implemented to work offline or in a mass parallel grid computing environment.

FIGS. 1-4 disclose systems and methods for finding keyword relationships using wisdoms from multiple sources. As described above, these systems and methods may be implemented for uses such as discovering semantically related words for purposes of bidding on online advertisements or to assist a searcher performing research at an Internet search engine. All or part of the steps of the method may be implemented by hardware, such as a processor or processors, instructed by a computer program, instructions, and/or software code. Additionally, part or all of the processes for implementing the methods according to the above embodiments may be accomplished by instructing related hardware via a program, instructions, and/or software code, and the program, instructions, and/or software code may be stored in a computer-readable storage medium, such as Read-Only Memory (ROM), Random Access Memory (RAM), magnetic disc and compact disc.

With respect to assisting a searcher performing research at an Internet search engine, a searcher may send one or more terms, or one or more sequences of terms, to a search engine. The search engine may use the received terms as seed terms and suggest related words related to the terms either with the search results generated in response to the received terms, or independent of any search results. Providing the searcher with related terms based on three different sources enables the searcher to broaden or focus any further searches so that the search engine provides more relevant search results to the searcher.

With respect to online advertisements, in addition to providing terms to an advertiser in a keyword suggestion tool, an online advertisement service provider may use the disclosed systems and methods in a campaign optimizer component to determine related terms to match advertisements to terms received from a search engine or terms extracted from the content of a webpage or news articles, also known as content match. Using related terms allows an online advertisement service provider to serve an advertisement if the term that an advertiser bids on is related to a term sent to a search engine rather than only serving an advertisement when a term sent to a search engine exactly matches a term that an advertiser has bid on. Providing the ability to serve an advertisement based on related terms when authorized by an advertiser provides increased relevance and efficiency to an advertiser so that an advertiser does not need to determine every possible word combination for which the advertiser's advertisement is served to a potential customer. Further, using related terms allows an online advertisement service provider to suggest more precise terms to an advertiser by clustering terms related to an advertiser, and then expanding each individual concept based on the generated related terms.

An online advertisement service provider may additionally use related terms to map advertisements or search listings directly to a sequence of search queries received at an online advertisement service provider or a search engine. For example, an online advertisement service provider may determine terms that are related to a seed set including two or more search queries in a sequence of search queries. The online advertisement service provider then uses the determined related terms to map an advertisement or search listing to the sequence of search queries.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method for determining related terms, the method comprising:
   receiving one or more terms;
   determining, in a cloud computing environment, a first plurality of distances based on the one or more received terms and a first plurality of terms that is derived from an algorithmic search list, wherein a search engine server generates the first plurality of terms based on the one or more received terms;
   determining, in the cloud computing environment, a second plurality of distances based on the one or more received terms and a second plurality of terms that is derived from a sponsored search list, wherein the second plurality of terms is generated based on the one or more received terms;
   determining, in the cloud computing environment, a third plurality of distances based on the one or more received terms and a third plurality of terms, wherein the third plurality of terms is derived from a search log;
   combining the first, second, and third pluralities of distances to derive a fourth plurality of distances; and
   generating a plurality of related terms related to the one or more received terms based on the fourth plurality of distances.

2. The computer implemented method of claim 1, wherein the one or more received terms comprises at least one of the following: a seed term, a keyword, a function of keywords, and an instruction to choose keywords.

3. The computer implemented method of claim 1, wherein a sponsored search server generates the sponsored search list based on the one or more received terms.

4. The computer implemented method of claim 1, wherein generating a plurality of related terms related to the one or more received terms based on the fourth plurality of distances comprises:
   recommending the plurality of related terms related to the one or more received terms when the corresponding combined distance is less than a predetermined value.

5. The computer implemented method of claim 1, wherein the related terms comprises at least one of text, voice, image, and video.

6. The computer implemented method of claim 1, wherein determining the first plurality of distances between the one or more received terms and the first plurality of terms from the search engine server comprises:
   weighing the one or more received terms and the first plurality of terms by term frequency inverse document frequency; and
   calculating a plurality of Euclidian distances between the one or more received terms and the first plurality of terms.

7. The computer implemented method of claim 1, wherein determining the first plurality of distances between the one or more received terms and the first plurality of terms from the search engine server comprises:
   applying probabilistic latent semantic indexing (PLSI) to the one or more received terms and a word bag comprising the first plurality of terms; and
   calculating a plurality of Kullback-Leibler (KL) divergences between the one or more received terms and the first plurality of terms in the word bag.

8. The computer implemented method of claim 1, wherein determining the second plurality of distances between the one or more received terms and the second plurality of terms from the advertisement server comprises:
   weighing the one or more received terms and the second plurality of terms by term frequency inverse document frequency; and
   calculating a plurality of Euclidian distances between the one or more received terms and the second plurality of terms.

9. The computer implemented method of claim 1, wherein the search log comprises Uniform Resource Locators (URLs) from search queries and search clicks in a search session.

10. The computer implemented method of claim 9, wherein a total duration of the search session is less than a first predetermined threshold.

11. The computer implemented method of claim 9, wherein a longest duration of inactivity in the search session is less than a second predetermined threshold.

12. The computer implemented method of claim 9, wherein determining the third plurality of distances between the one or more received terms and the third plurality of terms from the search log comprises:
   measuring a first plurality of similarities between previous one or more received terms and terms from the search log;
   measuring a second plurality of similarities between a pair of previous one or more received terms and a URL;
   measuring a third plurality of similarities between a pair of URLs; and
   leveraging the first, second, and third pluralities of similarities to determine the third plurality of distances.

13. The computer implemented method of claim 9, wherein combining the first, second, and third pluralities of distances to the fourth plurality of distances comprises:
   combining linearly a pair of distances from the first, second, and third pluralities of distances.

14. The computer implemented method of claim 9, wherein combining the first, second, and third pluralities of distances to the fourth plurality of distances comprises:

multiplying a pair of distances from the first, second, and third pluralities of distances.

15. The computer implemented method of claim 1, wherein determining the second plurality of distances between the one or more received terms and the second plurality of terms from the advertisement server comprises:
   applying probabilistic latent semantic indexing (PLSI) to the one or more received terms and a word bag comprising the second plurality of terms; and
   calculating a plurality of Kullback-Leibler (KL) divergences between the one or more received terms and the second plurality of terms in the word bag.

16. The computer implemented method of claim 1, wherein the one or more received terms comprises at least one of the following: a term from a user terminal and a term from a data file.

17. A computer-readable storage medium storing a set of instructions for generating related terms based on one or more terms, the set of instructions to direct a processor to perform acts of:
   receiving one or more terms;
   determining a first plurality of distances based on the one or more received terms and a first plurality of terms that is derived from an algorithmic search list generated by a search engine server based on the one or more received terms;
   determining a second plurality of distances based on the one or more received terms and a second plurality of terms that is derived from a sponsored search list generated based on the one or more received terms;
   determining a third plurality of distances based on the one or more received terms and a third plurality of terms that is derived from a search log;
   combining the first, second, and third pluralities of distances to derive a fourth plurality of distances; and
   generating a plurality of related terms related to the one or more received terms based on the fourth plurality of distances.

18. The computer-readable storage medium of claim 17, wherein determining the first plurality of distances between the one or more received terms and the first plurality of terms from the search engine server comprises:
   weighing the one or more received terms and the first plurality of terms by term frequency inverse document frequency; and
   calculating a plurality of Euclidian distances between the one or more received terms and the first plurality of terms.

19. The computer-readable storage medium of claim 17, wherein determining the first plurality of distances between the one or more received terms and the first plurality of terms from the search engine server comprises:
   applying probabilistic latent semantic indexing (PLSI) to the one or more received terms and a word bag comprising the first plurality of terms; and
   calculating a plurality of Kullback-Leibler (KL) divergences between the one or more received terms and the first plurality of terms in the word bag.

20. The computer-readable storage medium of claim 17, wherein determining the second plurality of distances between the one or more received terms and the second plurality of terms from the advertisement server comprises:
   applying probabilistic latent semantic indexing (PLSI) to the one or more received terms and a word bag comprising the second plurality of terms; and
   calculating a plurality of Kullback-Leibler (KL) divergences between the one or more received terms and the second plurality of terms in the word bag.

21. The computer-readable storage medium of claim 17, wherein the search log comprises Uniform Resource Locators (URLs) from search queries and search clicks in a search session.

22. The computer implemented method of claim 21, wherein a total duration of the search session is less than a first predetermined threshold.

23. The computer implemented method of claim 21, wherein a longest duration of inactivity in the search session is less than a second predetermined threshold.

24. A computer system for generating related terms based on an one or more terms, the computer system comprising:
   a first module configured to receive one or more terms;
   a second module configured to determine a first plurality of distances based on the one or more received terms and a first plurality of terms that is derived from an algorithmic search list generated by a search engine server based on the one or more received terms;
   a third module configured to determine a second plurality of distances based on the one or more received terms and a second plurality of terms that is derived from a sponsored search list generated based on the one or more received terms;
   a fourth module configured to determine a third plurality of distances based on the one or more received terms and a third plurality of terms that is derived from a search log;
   a fifth module configured to combine the first, second, and third pluralities of distances to derive a fourth plurality of distances; and
   a sixth module configured to generate a plurality of related terms related to the one or more received terms based on the fourth plurality of distances.
   wherein the search log comprises Uniform Resource Locators (URLs) from search queries and search clicks in a search session.

25. The computer system of claim 24, wherein a total duration of the search session is less than a first predetermined threshold.

26. The computer system of claim 24, wherein a longest duration of inactivity in the search session is less than a second predetermined threshold.

27. The computer system of claim 24, wherein the sponsored search list is generated by the search engine server based on the one or more received terms.

28. The computer system of claim 24, wherein the sixth module recommends the plurality of related terms related to the one or more received terms when the corresponding combined distance is less than a predetermined value.

29. The computer system of claim 24, wherein the first module is configured to receive one or more terms from at least one of the following: a user terminal and a data file.

* * * * *